US010873787B2

(12) United States Patent
Casey et al.

(10) Patent No.: US 10,873,787 B2
(45) Date of Patent: *Dec. 22, 2020

(54) INTERMEDIATE KEY FRAME SELECTION AND ANIMATION

(71) Applicant: MobiTV, Inc., Emeryville, CA (US)

(72) Inventors: David Casey, Orinda, CA (US); Bob Carlson, Burlingame, CA (US)

(73) Assignee: MobiTV, Inc., Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/550,428

(22) Filed: Aug. 26, 2019

(65) Prior Publication Data

US 2019/0379947 A1 Dec. 12, 2019

Related U.S. Application Data

(63) Continuation of application No. 14/613,916, filed on Feb. 4, 2015, now Pat. No. 10,440,443.

(51) Int. Cl.
| | |
|---|---|
| *H04N 21/6587* | (2011.01) |
| *H04N 21/234* | (2011.01) |
| *H04N 21/239* | (2011.01) |
| *H04N 21/472* | (2011.01) |
| *H04N 21/81* | (2011.01) |
| *H04N 21/414* | (2011.01) |
| *H04N 21/845* | (2011.01) |

(52) U.S. Cl.
CPC ....... *H04N 21/6587* (2013.01); *H04N 21/234* (2013.01); *H04N 21/2393* (2013.01); *H04N 21/23406* (2013.01); *H04N 21/41407* (2013.01); *H04N 21/47202* (2013.01); *H04N 21/47217* (2013.01); *H04N 21/8146* (2013.01); *H04N 21/8455* (2013.01)

(58) Field of Classification Search
CPC ............. H04N 21/6587; H04N 21/234; H04N 21/23406; H04N 21/2393; H04N 21/47217; H04N 21/47202; H04N 21/8146; H04N 21/41407; H04N 21/8455
See application file for complete search history.

(56) References Cited

U.S. PATENT DOCUMENTS

| 6,970,640 B2 | 11/2005 | Green et al. |
| 7,313,808 B1 | 12/2007 | Gupta et al. |
| (Continued) | | |

OTHER PUBLICATIONS

U.S. Appl. No. 14/613,916, Issue Notification received from USPTO, dated Oct. 8, 2019, 1 pg.

(Continued)

*Primary Examiner* — Nathan J Flynn
*Assistant Examiner* — Christine A Kurien
(74) *Attorney, Agent, or Firm* — Kwan & Olynick LLP

(57) ABSTRACT

Mechanisms provide intermediate key frame animation during a media seek. A streaming server receives a seek request from a client device while the streaming server provides the client device with a media stream. The seek request is made when the media stream is playing at an initial location and the seek request includes a request to play the media stream from a seek location. In some embodiments, intermediate key frames before the seek location are identified. In other instances, intermediate key frames between the initial location and the seek location are identified. These intermediate key frames are provided to the client device for display before the media stream begins playing at the seek location.

20 Claims, 6 Drawing Sheets

(56) References Cited

U.S. PATENT DOCUMENTS

| | | |
|---|---|---|
| 8,060,638 B1 | 11/2011 | Kapoor |
| 9,060,190 B2 | 6/2015 | Li et al. |
| 9,094,737 B2 | 7/2015 | Shivadas et al. |
| 2004/0264789 A1 | 12/2004 | Akiyama et al. |
| 2006/0010480 A1 | 1/2006 | Gaumond et al. |
| 2008/0192818 A1 | 8/2008 | DiPietro et al. |
| 2011/0292244 A1 | 12/2011 | Deever |
| 2014/0380376 A1 | 12/2014 | Schmidt et al. |
| 2015/0334435 A1 | 11/2015 | Shivadas et al. |
| 2016/0227295 A1 | 8/2016 | Casey et al. |

OTHER PUBLICATIONS

U.S. Appl. No. 14/613,916, Advisory Action dated Apr. 9, 2019, 3pgs.

U.S. Appl. No. 14/613,916, Advisory Action dated Dec. 6, 2016, 3pgs.

U.S. Appl. No. 14/613,916, Examiner Interview Summary dated Apr. 29, 2019, 3pgs.

U.S. Appl. No. 14/613,916, Final Office Action dated Aug. 8, 2016, 9pgs.

U.S. Appl. No. 14/613,916, Final Office Action dated Oct. 19, 2017, 11pgs.

U.S. Appl. No. 14/613,916, Final Office Action dated Dec. 31, 2018, 10pgs.

U.S. Appl. No. 14/613,916, Non Final Office Action dated Feb. 4, 2016, 9pgs.

U.S. Appl. No. 14/613,916, Non Final Office Action dated Mar. 10, 2017, 11pgs.

U.S. Appl. No. 14/613,916, Non Final Office Action dated Apr. 1, 2018, 11pgs.

U.S. Appl. No. 14/613,916, Notice of Allowance dated Jun. 24, 2019, 7pgs.

INTERMEDIATE KEY FRAME SELECTION AND ANIMATION

CROSS-REFERENCE TO RELATED APPLICATIONS

This application is a continuation of and claims priority to U.S. patent application Ser. No. 14/613,916, entitled, "INTERMEDIATE KEY FRAME SELECTION AND ANIMATION", filed on Feb. 4, 2015, by David Casey which is hereby incorporated by reference in its entirety and for all purposes.

TECHNICAL FIELD

The present disclosure relates to media streams. In one example, the present invention relates to methods and apparatus for providing intermediate key frame selection and animation during a media seek.

DESCRIPTION OF RELATED ART

Conventional media providers typically allow a user watching streaming video to seek to another playback location by moving a scroll bar, selecting a particular place on a playback bar, selecting a fast forward or backward button (which allows the user to skip forward or backward a predetermined amount), or the like. While the user is waiting for playback to begin at the new seek location, conventional systems typically involve leaving the last video image on screen, stopping the audio, and displaying a spinner or other icon that indicates that the video is loading or buffering. Sometimes this spinner or icon includes animation. The video image on screen typically remains the same for several seconds while the media player locates and prepares for playback from the new seek location. For mobile devices using wide area wireless networks, a media player typically takes from three to eight seconds or more to begin playback at the new seek location. Next, a new image, possibly a key frame (e.g., I-frame) appears for a few seconds while the new data is buffering. Finally the spinner or icon disappears and the video begins playing from the new seek location.

Although the spinner or other icon may be animated in some implementations, waiting for the new data to load can be boring or tedious for a user. In many cases, the user does not know how long it will take to load the new data and if it takes several seconds, the user may become frustrated or may even navigate away from the media. Accordingly, it is desirable to provide an improved user experience when a user wishes to seek to different locations in a media stream.

OVERVIEW OF THE INVENTION

Mechanisms provide intermediate key frame animation during a media seek. A streaming server receives a seek request from a client device while the streaming server provides the client device with a media stream. The seek request is made when the media stream is playing at an initial location and the seek request includes a request to play the media stream from a seek location. In some embodiments, intermediate key frames before the seek location are identified. In other instances, intermediate key frames between the initial location and the seek location are identified. These intermediate key frames are provided to the client device for display before the media stream begins playing at the seek location.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which illustrate particular embodiments of the present invention.

DESCRIPTION OF PARTICULAR EMBODIMENTS

Figure 1:
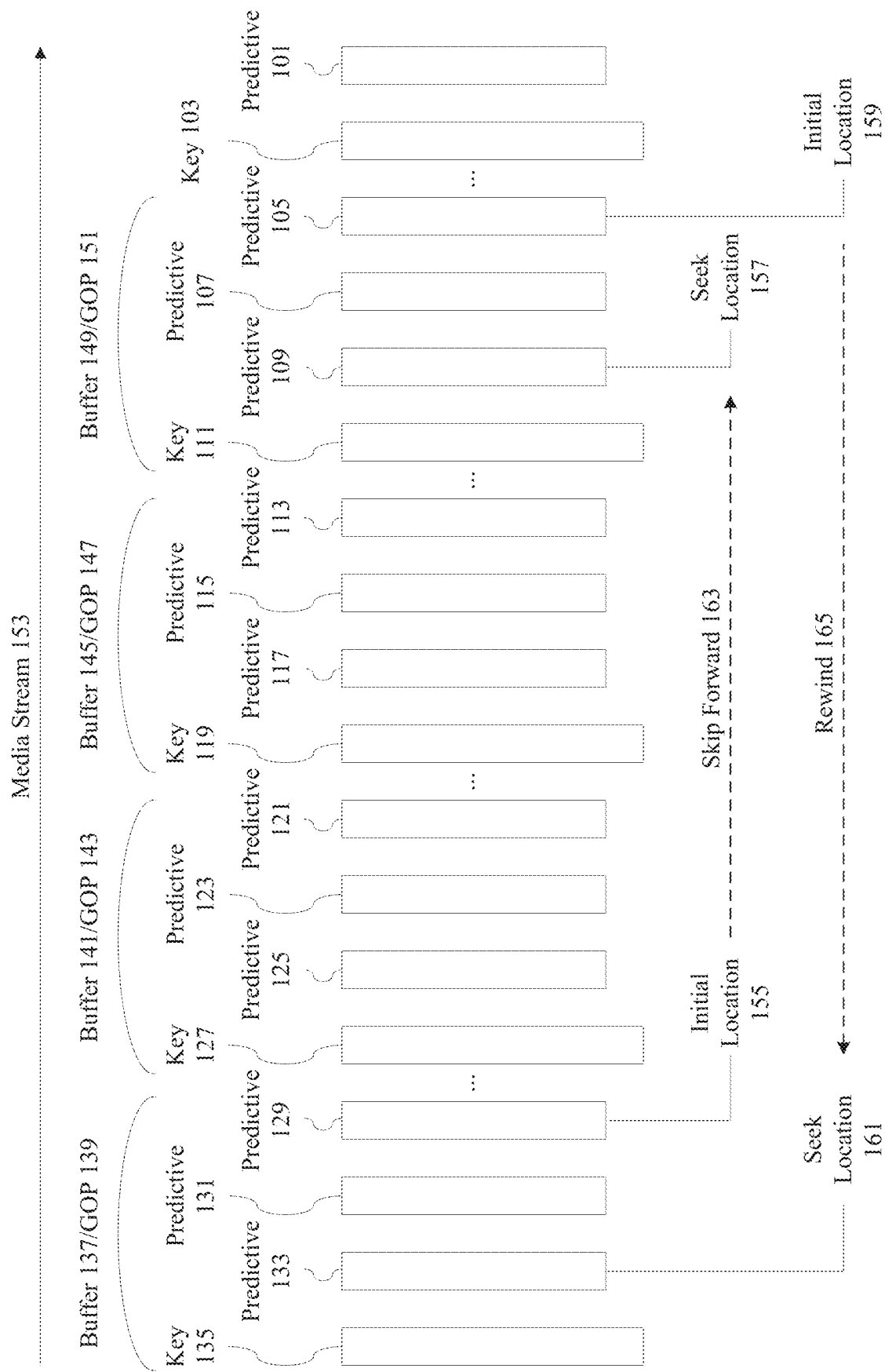
FIG. 1 is a diagrammatic representation showing a sequence of media stream frames.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of particular networks and particular devices. However, it should be noted that the techniques of the present invention can be applied to a variety of different networks and a variety of different devices. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a processor is used in a variety of contexts. However, it will be appreciated that multiple processors can also be used while remaining within the scope of the present invention unless otherwise noted. Furthermore, the techniques and mechanisms of the present invention will sometimes describe two entities as being connected. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Conventional media providers typically allow a user watching streaming video to seek to another playback location by moving a scroll bar, selecting a particular place on a playback bar, selecting a fast forward or backward button (which allows the user to skip forward or backward a predetermined amount), or the like. While the user is waiting for playback to begin at the new seek location, conventional systems typically involve leaving the last video image on screen, stopping the audio, and displaying a spinner or other icon that indicates that the video is loading or buffering. Although the spinner or other icon may be animated in some implementations, waiting for the new data to load can be boring or tedious for a user. Accordingly, it is desirable to provide an improved user experience when a user wishes to seek to different locations in a media stream.

Various embodiments of the present disclosure provide the user with an engaging experience while waiting to seek through video. In particular, a motion-jpeg animation of key frames (such as I-frames) is provided to the user while a media player is seeking and buffering the new content. The animation can be timed to match the playback of the media from the new location to provide a seamless transition between the key frame animation and the full playback of the media.

According to various embodiments, the motion jpeg animation is displayed to the user immediately once the user has provided a seek request. The movements of the characters and/or scene can be followed roughly in the animated sequence of key frames. However, in many implementations, the frame rate is lower, the images provided may be lower resolution, and there may be no audio, in order to accommodate bandwidth and processing limitations. The animated sequence can then seamlessly transition into the full playback of the video stream (including audio) from the new seek position.

Providing an animated sequence of key frames during a seek request provides numerous advantages. In particular, presenting an animated sequence creates an improved user experience during seek wait times. Because key frames are shown from the current media title, the user is more likely to remain engaged in the media during seek requests and such engagement can increase user satisfaction. In addition, this improved user experience encourages users to seek through the media and can drive usage of the streaming media.

Various devices have the capability of playing media streams received from a streaming server. One example of a media stream is a Moving Picture Experts Group (MPEG) video stream. Media streams such as MPEG video streams often encode media data as a sequence of frames and provide the sequence of frames to a client device. Some frames are key frames that provide substantially all of the data needed to display an image. An MPEG I-frame is one example of a key frame. Other frames are predictive frames that provide information about differences between the predictive frame and a reference key frame.

Streaming servers receive media streams such as audio and video streams from associated encoders and content providers and send the media streams to individual devices. In order to conserve network resources, media streams are typically encoded in order to allow efficient transmission. One mechanism for encoding media streams such as video streams involves the use of key frames and predictive frames. Although a key frame holds substantially all of the data needed to display a video frame, a predictive frame holds only change information or delta information between itself and a reference key frame. Consequently, predictive frames are typically much smaller than key frames. In general, any frame that can be displayed substantially on its own is referred to herein as a key frame. Any frame that relies on information from a reference key frame is referred to herein as a predictive frame. In many instances, many predictive frames are transmitted for every key frame transmitted. Moving Picture Experts Group (MPEG) provides some examples of encoding systems using key frames and predictive frames. MPEG and its various incarnations use I-frames as key frames and B-frames and P-frames as predictive frames.

A streaming server includes a buffer to hold media streams received from upstream sources. In some examples, a streaming server includes a first in first out (FIFO) buffer per channel of video received. When a client device requests a particular media stream from the streaming server, the streaming server begins to provide the media stream, typically by providing the oldest frame still in the buffer. A client device may request a media stream when a user is a changing a channel, launching an application, or performing some other action that initiates a request for a particular media stream or channel.

According to various embodiments, key frames can be used to create an animated sequence to be presented to a user during a seek request. Although there may be a relative infrequency of key frames in a video stream, a streaming server can identify key frames in media streams maintained in one or more buffers. Although key frames may be large files requiring more bandwidth, thumbnails or lower resolution versions of the key frames associated with media content can be downloaded as bandwidth is available. These thumbnails or lower resolution versions can be retrieved and presented to the user as an animated sequence when a user makes a seek request.

With reference to FIG. 1, shown is a diagrammatic representation showing a sequence of media stream frames. According to various embodiments, a sequence of frames such as a sequence of video frames is received at a streaming server. In some embodiments, the sequence of video frames is associated with a particular channel and a buffer is assigned to each channel. Other sequences of video frames may be held in other buffers assigned to other channels. In other examples, buffers or portions of buffers are maintained for separate video streams and separate channels. In particular embodiments, key frame 135 is received early along the forward play direction of media stream 153. One example of a key frame 135 is an I-frame that includes substantially all of the data needed for a client device to display a frame of video. Key frame 135 is followed by predictive frames 133, 131, and 129, and can include any number of predictive frames as indicated by the dots following predictive frame 129.

According to various embodiments, a sequence of different frames types, beginning with a key frame and ending just before a subsequent key frame, is referred to herein as a Group of Pictures (GOP). Key frame 135 and predictive frames 133, 131, and 129 are associated with GOP 139 and maintained in buffer 137. An encoding application typically determines the length and frame types included in a GOP. According to various embodiments, an encoder provides the sequence of frames to the streaming server. In some examples, a GOP is 15 frames long and includes an initial key frame such as an I-frame followed by predictive frames such as B and P frames. A GOP may have a variety of lengths. An efficient length for a GOP is typically determined based upon characteristics of the video stream and bandwidth constraints. For example, a low motion scene can benefit from a longer GOP with more predictive frames. Low motion scenes do not need as many key frames. A high motion scene may benefit from a shorter GOP as more key frames may be needed to provide a good user experience.

According to various embodiments, GOP 139 is followed by GOP 143 maintained in buffer 141. GOP 143 includes key frame 127 followed by predictive frames 125, 123, and 121. Similarly, GOP 143 is followed by GOP 147 maintained in buffer 145. In addition, GOP 147 is followed by GOP 151 maintained in buffer 149. In some examples, a buffer used to maintain the sequence of frames is a first in first out (FIFO) buffer. When new frames are received, the oldest frames are removed from the buffer. Although a certain number of GOPs and frames are shown, any number of GOPs and frames can be included.

According to various embodiments, a user may wish to seek to another location within the media stream 153 during playback. More specifically, a user may indicate to a client device, such as a mobile device, computer, or other media playback device, that the user would like to change where in the media stream 153 playback should continue. For example, if the user wants to skip forward 163 from an initial location 155 to a seek location 157, the user can input that request into the client device. The client device can then pass on this seek request to a streaming server that is providing media stream 153. The streaming server can then identify intermediate key frames between the initial location 155 and the seek location 157, such as key frames 127, 119, and 111. These intermediate key frames are then provided to the client device to play as a sequence before media stream begins playback at seek location 157. In some examples, the intermediate key frames are I-frames and the media stream 153 is a video stream. The sequence of intermediate key frames shown to the user moves logically forward from the user's initial location 155 to the new seek location 157. The sequence of intermediate key frames, which appears to the user as an animation, can then cross-dissolve smoothly into the video (including audio) as it begins playing from seek location 157. According to various embodiments, the duration of the animation must be set before seek and animation can begin. For instance, a streaming server may provide animation for six seconds while it prepares the media stream 153 for playback from a new seek location 157. Typically, the duration of animation will be set for a fixed amount of time.

In another example, a user may want to rewind 165 from an initial location 159 to a seek location 161. Once the user inputs this request into the client device, the client device passes on this seek request to a streaming server that is providing media stream 153. The streaming server can then identify intermediate key frames between the initial location 159 and the seek location 161, such as key frames 111, 119, and 127. These intermediate key frames are then provided to the client device to play as a sequence before media stream begins playback at seek location 161. According to various embodiments, the animation is similar to a short "rewind," such that intermediate key frames are shown in reverse order relative to the normal playback direction of media stream 153. In some examples, the intermediate key frames are I-frames and the media stream 153 is a video stream. The sequence of intermediate key frames shown to the user moves backwards from the user's initial location 159 to the new seek location 161. The sequence of intermediate key frames, which appears to the user as an animation, can then cross-dissolve smoothly into the video as it begins playing (in a forward direction along media stream 153) from seek location 161. According to various embodiments, the duration of the animation must be set before seek and animation can begin. For instance, a streaming server may provide animation for six seconds while it prepares the media stream 153 for playback from a new seek location 161. Typically, the duration of animation will be set for a fixed amount of time.

According to various embodiments, intermediate key frames can be identified in numerous ways. In some examples, a streaming server performs processing on each received frame to determine which frames are key frames. Identifying key frames may involve decoding or partially decoding a frame. In other examples, key frames may be identified based upon the size of the frame, as key frames are typically much larger than predictive frames. In other examples, only a subset of frames are decoded or partially decoded. In still other examples, once a key frame is determined, the streaming server determines the GOP size N and identifies each Nth frame following a key frame as a subsequent key frame. A variety of approaches can be used to determine key frames and predictive frames. Although the techniques of the present invention contemplate efficient mechanisms for identifying key frames, the streaming server may perform some additional processing. In addition, the key frames identified between the initial location and seek location constitute the intermediate key frames to be presented to the user during a seek request.

According to various embodiments, the intermediate key frames are downloaded to the client device prior to a seek request. In addition, the intermediate key frames downloaded prior to the seek request may include thumbnails or lower resolution images in order to accommodate bandwidth limitations, etc. For example, when a media stream 153 is requested by a user, the intermediate key frames may be downloaded initially on the client device in case the user wants to seek sometime during playback. In some examples, the intermediate key frames can be downloaded as bandwidth is available, but must be downloaded prior to a seek request. According to various applications, the key frames can be I-frame images stored as jpeg files. The manner in which the intermediate key frame images are formatted, stored, and downloaded can vary. For instance, depending on the available bandwidth and processing capabilities, the images can be stored at a lower resolution (such as thumbnails), etc. The higher resolution original key frames can be buffered and downloaded later for regular playback of the media stream 153.

Figure 2:
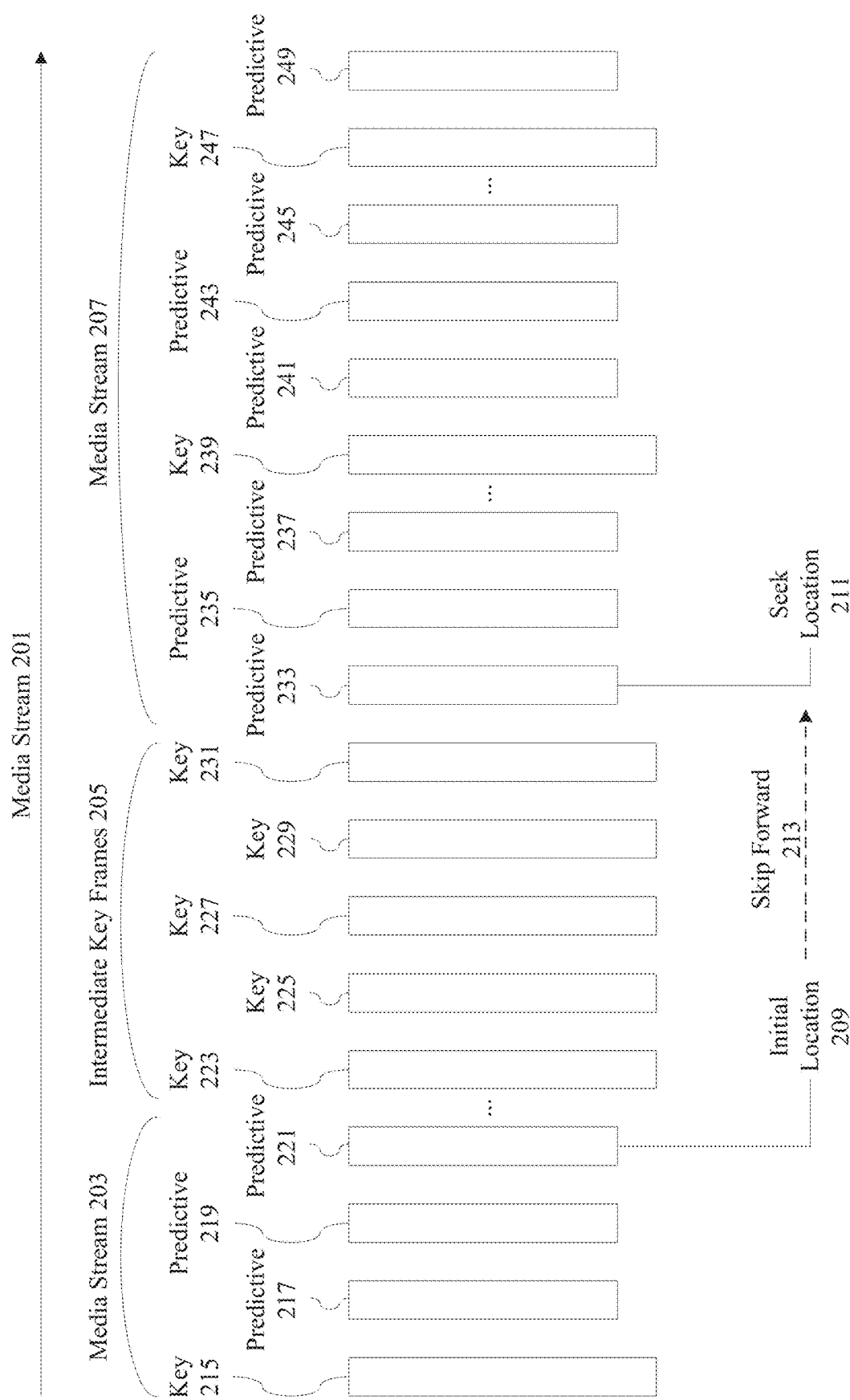
FIG. 2 is a diagrammatic representation showing a sequence of media stream frames provided during a seek request.

With reference to FIG. 2, shown is a diagrammatic representation of a sequence of media stream frames provided during a seek request. In particular, the frames shown are those presented to the user skipping forward 213 from an initial location 209 to a seek location 211, such that the seek location 211 is situated after the initial location 209 in media stream 201. More specifically, the media stream portion 203 is playing at regular speed when the user indicates to a client device, such as a mobile device, computer, or other media playback device, that the user would like to skip forward 213 from the initial location 209 to a seek location 211. The client device passes on this seek request to a streaming server that is providing media stream 201. The streaming server then identifies intermediate key frames 205 between the initial location 209 and the seek location 211, such as key frames 223, 225, 227, 229, and 231. Although a particular number of key frames are shown, any number can be used depending on the application. These intermediate key frames are then provided to the client device to play as a sequence before the media stream begins playback at seek location 211. As described above with regard to FIG. 1, the intermediate key frames are previously downloaded and may include lower resolution images or other files that are retrieved during a seek request. In some examples, the intermediate key frames are I-frames and the media stream 201 is a video stream. The sequence of intermediate key frames 205 shown to the user moves logically forward from the user's initial location 209 to the new seek location 211. The sequence of intermediate key frames, which appears to the user as an animation, can then cross-dissolve smoothly into the regular playback of the media stream portion 207 (including audio) as it begins playing from seek location 211. According to various embodiments, the duration of the animation must be set before seek and animation can begin. For instance, a streaming server may provide animation for six seconds while it prepares the media stream 207 for playback from a new seek location 211. Typically, the duration of animation to be played on the client device will be set for a fixed amount of time, e.g. a third of a second to two seconds.

Figure 3:
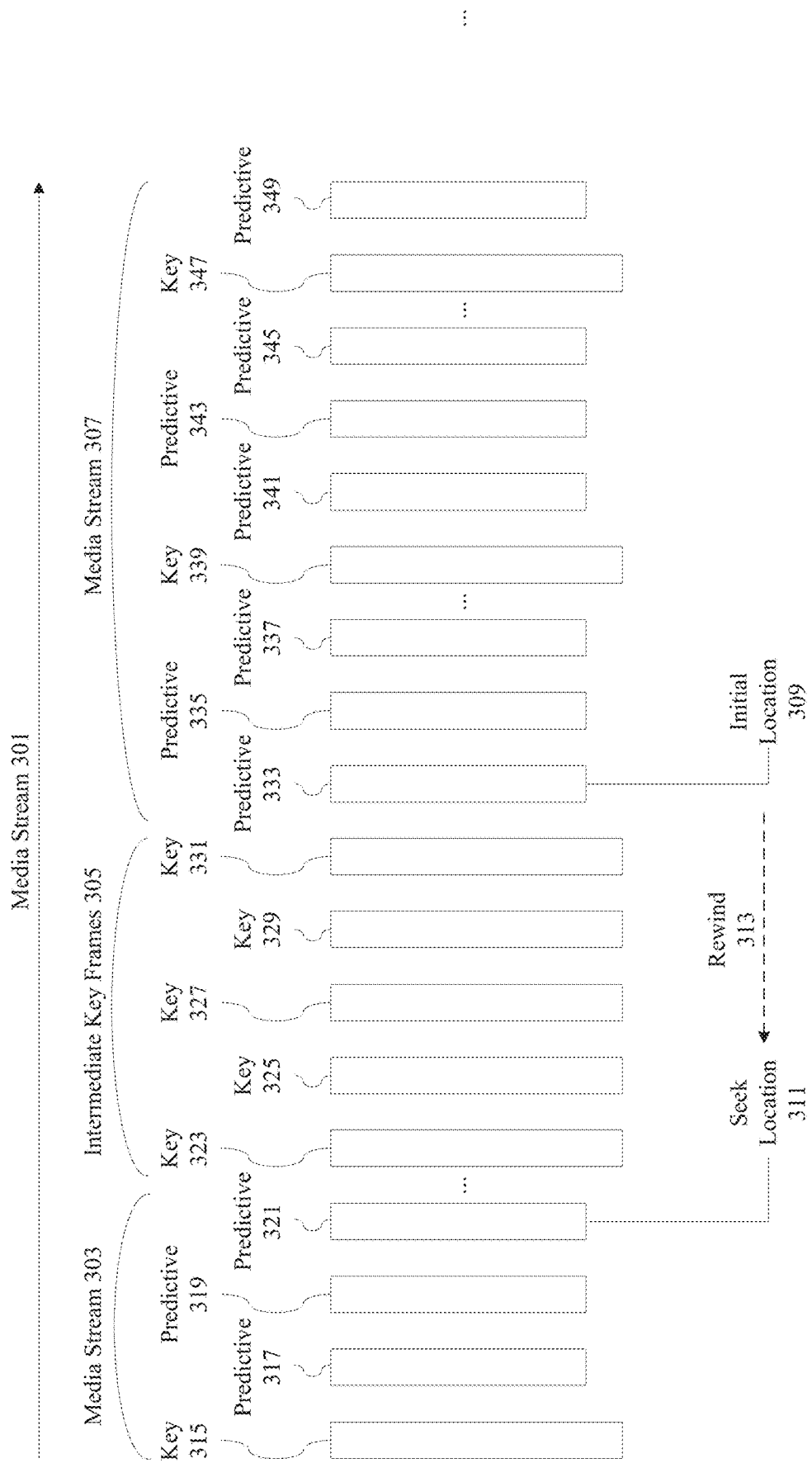
FIG. 3 is a diagrammatic representation showing another sequence of media stream frames during a seek request.

With reference to FIG. 3, shown is a diagrammatic representation of another sequence of media stream frames provided during a seek request. In particular, the frames shown are those presented to the user rewinding 313 from an initial location 309 to a seek location 311, such that the seek location 311 is situated before the initial location 309 in media stream 301. More specifically, the media stream portion 307 is playing at regular speed when the user indicates to a client device, such as a mobile device, computer, or other media playback device, that the user would like to rewind 313 from an initial location 309 to a seek location 311. The client device passes on this seek request to a streaming server that is providing media stream 301. The streaming server then identifies intermediate key frames 305 between the initial location 309 and the seek location 311, such as key frames 331, 329, 327, 325, and 323. Although a particular number of key frames are shown, any number can be used depending on the application.

These intermediate key frames are then provided to the client device to play as a sequence before media stream begins playback at seek location 311. As described above with regard to FIG. 1, the intermediate key frames are previously downloaded and may include lower resolution images or other files that are retrieved during a seek request. In some examples, the intermediate key frames are I-frames and the media stream 301 is a video stream. The sequence of intermediate key frames 305 shown to the user moves backwards from the user's initial location 309 to the new seek location 311. The sequence of intermediate key frames, which appears to the user as an animation, can then cross-dissolve smoothly into the regular playback at the end of media stream portion 303 (including audio) as it begins playing from seek location 311. As shown, the new playback begins with a predictive frame 321. In some examples, the next key frame occurring after predictive frame 321 in media stream 301 will begin the regular playback after seek location 311 is reached. According to various embodiments, the duration of the animation must be set before seek and animation can begin. For instance, a streaming server may provide animation for six seconds while it prepares the media stream 301 for playback from a new seek location 311. Typically, the duration of animation to be played on the client device will be set for a fixed amount of time.

Figure 4:
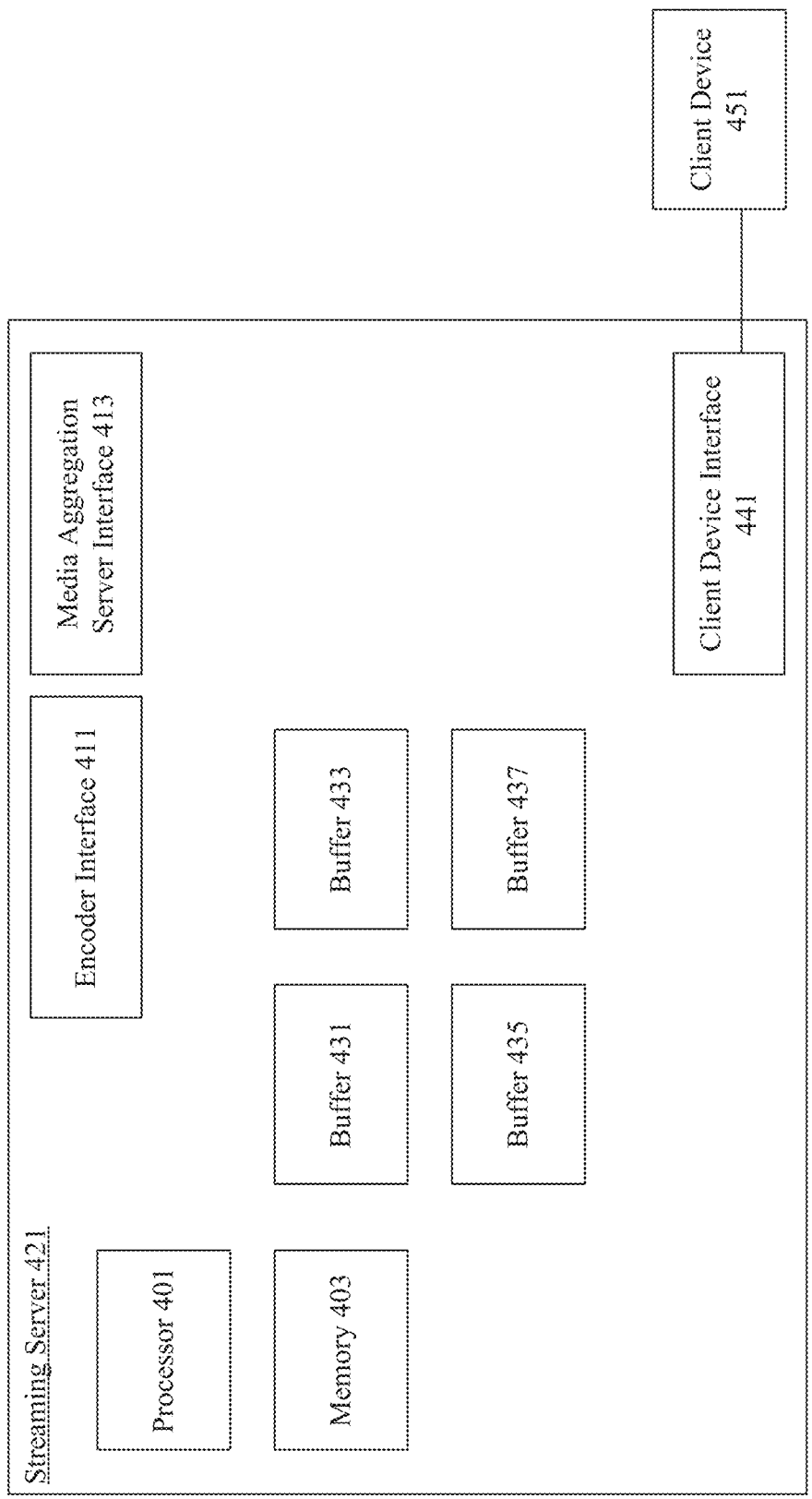
FIG. 4 is a diagrammatic representation showing one example of a streaming server.

With reference to FIG. 4, shown is a diagrammatic representation of one example of a streaming server. Although one particular example showing particular devices is provided, it should be noted that the techniques of the present invention can be applied to a variety of streaming servers and networks. According to various embodiments, the techniques of the present invention can be used on any streaming server having a processor, memory, and the capability of identifying characteristics of frames such as frame type in a media stream. According to various embodiments, a streaming server is provided with video streams from an associated encoder and handles connection requests from client devices such as computer systems, mobile phones, personal digital assistants, video receivers, and any other device having the capability of decoding a video stream.

According to various embodiments, the streaming server 421 includes a processor 401, memory 403, buffers 431, 433, 435, and 437, and a number of interfaces. In some examples, the interfaces include an encoder interface 411, a media aggregation server interface 413, and a client device interface 441. The encoder interface 411 and the media aggregation server interface 413 are operable to receive media streams such as video streams.

Media content can be provided from a number of different sources through media aggregation server interface 413. According to various embodiments, media content may be provided from film libraries, cable companies, movie and television studios, commercial and business users, etc. and maintained at a media aggregation server. Any mechanism for obtaining media content from a large number of sources in order to provide the media content to mobile devices in live broadcast streams is referred to herein as a media content aggregation server. The media content aggregation server may be clusters of servers located in different data centers. According to various embodiments, content provided to a media aggregation server is provided in a variety of different encoding formats with numerous video and audio codecs. Media content may also be provided via satellite feed.

According to various embodiments, the encoder interface 411 can allow streaming server 421 to interact with an encoder farm. An encoder farm can be associated with a satellite feed and can also be associated with a media aggregation server. The encoder farm can be used to process media content from the satellite feed as well as possibly from the media aggregation server into potentially numerous encoding formats. The media content may also be encoded to support a variety of data rates. The media content from the media aggregation server and encoder farm can be provided as live media to streaming server 421. According to various embodiments, the encoder farm converts video data into video streams such as MPEG video streams with key frames and predictive frames. In some examples, hundreds of video streams associated with hundreds of channels are continuously being received and maintained in buffers 431, 433, 435, and 437 before being provided to client devices through client device interface 441. According to various embodiments, buffers 431, 433, 435, and 437 are provided on a per channel basis. In other examples, buffers are provided on a per GOP basis. Although buffers 431, 433, 435, and 437 are shown as discrete entities, it should be recognized that buffers 431, 433, 435, and 437 may be individual physical buffers, portions of buffers, or combinations of multiple physical buffers. In some examples, virtual buffers are used and portions of a memory space are assigned to particular channels based on need.

According to various embodiments, the streaming server 421 can handle numerous connection requests from various client devices, one of which is shown as client device 451. Connection requests can result from a variety of user actions such as a seek request, channel change, application launch, program purchase, etc. According to various implementations described herein, the streaming server 421 can be an intelligent streaming server that identifies intermediate key frames in video streams and provides an appropriate series of key frames in response to a seek request.

Possible client devices 451 include mobile devices, personal digital assistants (PDAs), cellular phones, personal computing devices, computer systems, television receivers, etc. According to particular embodiments, the client device can be a mobile device connected to a wireless local area network (WLAN) or some other wireless network. The mobile device can communicate with the streaming server 421 over a wireless network. Live media streams provided over RTSP can be carried and/or encapsulated on any one of a variety of networks. Alternatively, the client devices can be connected to a cellular network run by a cellular service provider. Cell towers typically provide service in different areas.

Although a particular streaming server 421 is described, it should be recognized that a variety of alternative configurations are possible. For example, some modules such as a media aggregation server interface may not be needed on every server. Alternatively, multiple client device interfaces for different types of client devices may be included. A variety of configurations are possible.

Figure 5:
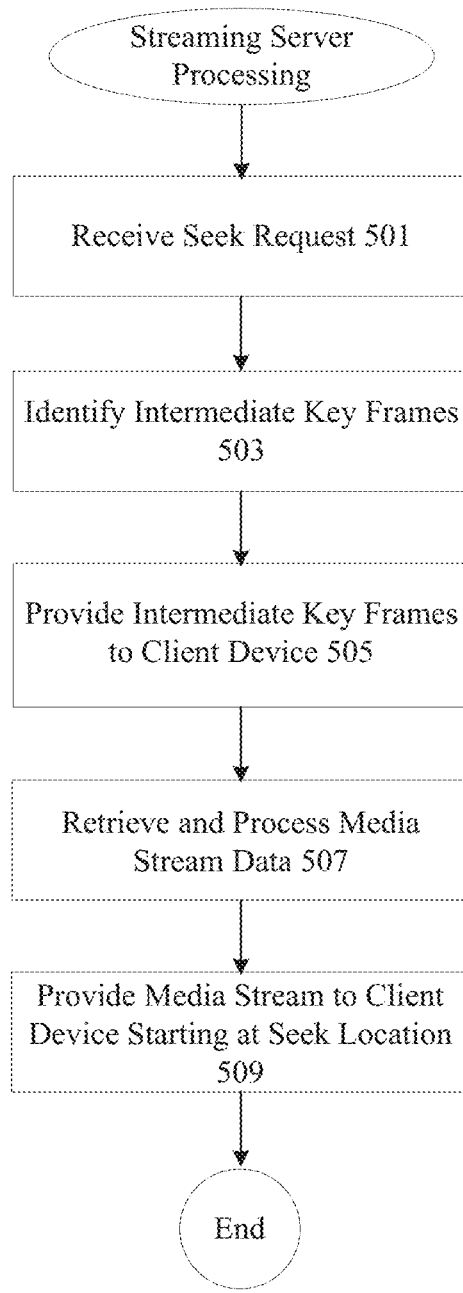
FIG. 5 is a flow process diagram showing processing at a streaming server.

With reference to FIG. 5, shown is a flow process diagram showing processing at a streaming server. In the present embodiment, the streaming server receives a seek request from a client device at 501. The seek request is received while the streaming server is providing a media stream to the client device. The media stream is playing at an initial location at the time of the seek request and the seek request includes a seek location (which is different from the initial location), from which a user wishes to play the media stream. According to various examples, the client device can be a mobile device. In addition, the mobile device or other client device can communicate wirelessly with the streaming server in some examples.

Next, at 503, the streaming server identifies intermediate key frames between the initial position and the seek location. As described above with regard to various embodiments, these intermediate key frames can be previously downloaded and may be lower resolution, etc. in some examples. In some instances, identifying key frames may involve determining the video codec, the GOP size, and/or the frame size and performing decoding or partial decoding of frames. A streaming server may be able to determine key frames by identifying the start of a GOP and the GOP size and flagging each start of a GOP as a key frame. A streaming server may also identify larger frames as key frames. Partial decoding or full decoding can also be used. Alternatively, a set of key frames can be downloaded to the client device at lower resolution, etc. when the media stream is initially selected for playback by the client device and the key frames can be labeled based on corresponding locations along the media stream. Intermediate key frames can be located within this set of key frames when a seek request is received at the streaming processor. Various mechanisms can be used to identify the appropriate intermediate key frames within this set of key frames, such as corresponding GOP, playback location, etc.

In the present embodiment, the intermediate key frames are then provided to the client device at 505. As also described above with regard to various embodiments, the intermediate key frames can be provided as an animated sequence for a predetermined amount of time. During this predetermined amount of time, the streaming server retrieves and processes the media stream data at 507. More specifically, the streaming server prepares to present the media stream playback from the seek location. The predetermined amount of time can be a fixed amount of time that provides enough leeway for the streaming server to prepare the media stream under various network conditions, such as high traffic, etc. Next, the streaming server provides the media stream to the client device starting at the seek location at 509. According to various embodiments, the animation can blend into the media stream when the media stream begins playing from the seek location. In some examples, the animation can be blended into regular playback by cross-dissolving the animation into the regular playback.

Figure 6:
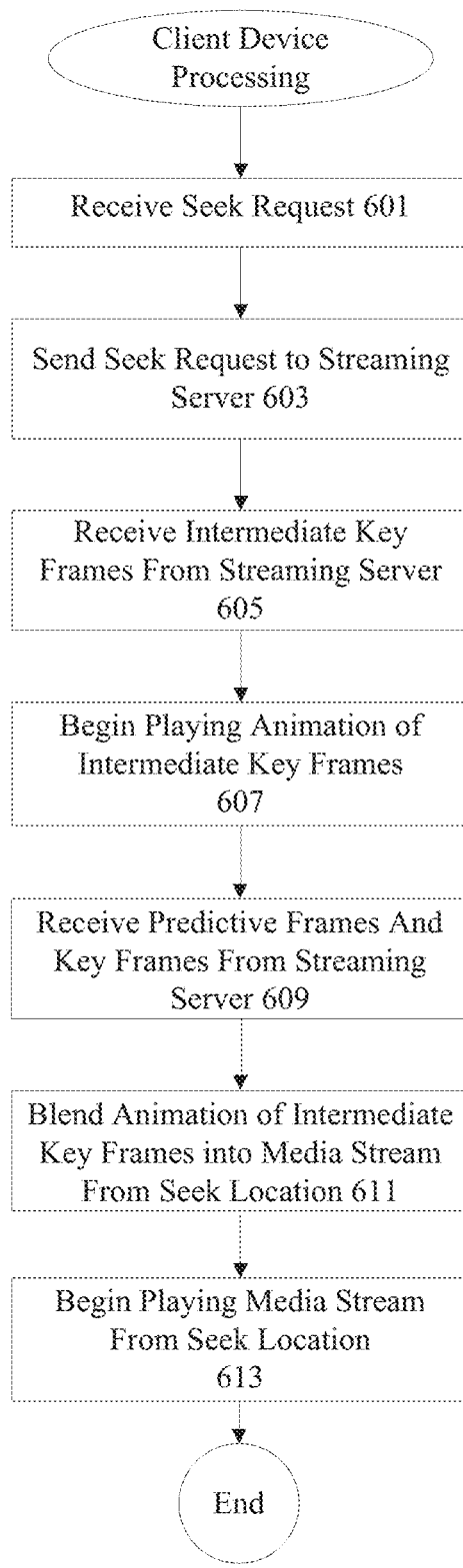
FIG. 6 is a flow process diagram showing processing at a client device.

With reference to FIG. 6, shown is a flow process diagram showing processing at a client device. As described above with regard to various embodiments, a client device can be a mobile device in some examples. Furthermore, the client device can communicate wirelessly with a streaming server in various embodiments. However, it should be noted that a client device can be any device that is capable of displaying a media frame, such as a video frame. For instance, a client device can be any computer system, portable computing device, gaming device, mobile phone, receiver, etc. In some examples, the client device includes a decoder that processes the video stream received from the streaming server. In other examples, a decoding device may reside between the client device and the streaming server, and the client device simply plays video data.

At 601, a seek request is received at the client device. According to various embodiments, the request on the client device may be the result of a user action. For instance, a user may scroll to a new playback location or otherwise indicate that a new playback location is desired. In response to receiving the seek request, the client device then sends a seek request to the streaming server providing the media stream at 603. Next, the client device receives intermediate key frames from the streaming server at 605. As described above with regard to various embodiments, these intermediate key frames may be lower resolution images than the key frames used in regular playback. Furthermore, the intermediate key frames are frames located between the initial location in the media stream when the seek request was made and the desired seek location. At 607, the client device begins playing an animated sequence of the intermediate key frames. According to various examples, this animated sequence of intermediate key frames is played on the client device for a fixed amount of time.

While the animation of intermediate key frames is playing, the client device receives predictive frames and key frames from the streaming server at 609, in anticipation of providing regular playback beginning from the seek location. As the animated sequence of intermediate key frames comes to an end, this animation can be blended into regular playback of the media stream at the seek location at 611. In some examples, the animation can be blended into regular playback by cross-dissolving the animation into the regular playback. Next, the client device begins playing the media stream from the seek location at 613. From the seek location, regular playback resumes in the forward direction along the media stream, and includes audio if audio is a part of the media stream. Intermediate and key frames are then played in regular playback mode with full resolution of the frames.

While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method comprising:
receiving a seek request from a client device, the seek request received at a streaming server providing a media stream to the client device, wherein the media stream is playing at an initial location at the time of the seek request, wherein the seek request includes a request to play the media stream from a seek location different from the initial location;
identifying intermediate key frames associated with the seek location;
sending thumbnails or low resolution versions of the identified intermediate key frames as bandwidth is available, wherein the thumbnail or low resolution versions of the identified intermediate key frames are provided as a series of images that can be viewed as a motion animation of the identified intermediate key frames for display before providing the media stream to the client device beginning at the seek location, wherein the identified intermediate key frames are shown as a series of images associated with a motion animation at the client device instead of displaying a spinner or other icon that indicates that the video is loading or buffering;
sending predictive frames and key frames to the client device for playback of the media stream starting at the seek location during playing of the animation; and
transitioning the animation into playback of the media stream at the seek location by cross-dissolving the animation directly into playback of the media stream, wherein the motion animation is timed to match full playback of the media stream from the new location to provide a seamless transition between the motion animation and the full playback of the media.

2. The method of claim 1, wherein the intermediate key frames are I-frames.

3. The method of claim 1, wherein the seek location is situated after the initial position in the media stream, wherein the intermediate key frames reside between the initial position and the seek position.

4. The method of claim 1, wherein the seek location is situated before the initial position in the media stream, wherein the intermediate key frames reside between the initial position and the seek position.

5. The method of claim 1, wherein the seek location is situated before the initial position in the media stream, wherein the intermediate key frames reside before the seek position.

6. The method of claim 1, wherein the intermediate key frames are downloaded to the client device when excess bandwidth is available.

7. The method of claim 1, wherein the client device is a mobile device.

8. The method of claim 7, wherein the mobile device communicates with the streaming server over a wireless network.

9. The method of claim 1, wherein the intermediate key frames are identified by using a decoding operation.

10. The method of claim 1, wherein the intermediate key frames are identified based on frame size.

11. The method of claim 1, wherein the intermediate key frames are displayed on the client device for a fixed amount of time.

12. The method of claim 1, wherein the intermediate key frames are shown as a series of images associated with a motion animation upon the client device receiving user interface input.

13. A system comprising:
an interface configured to receive a seek request from a client device, the seek request received at a streaming server providing a media stream to the client device, wherein the media stream is playing at an initial location at the time of the seek request, wherein the seek request includes a request to play the media stream from a seek location different from the initial location, wherein the interface is further configured to send sending thumbnails or low resolution versions of the identified intermediate key frames as bandwidth is available, wherein the thumbnail or low resolution versions of the identified intermediate key frames are provided as a series of images that can be viewed as a motion animation of the identified intermediate key frames for display before providing the media stream to the client device at the seek location, wherein the identified intermediate key frames are shown as a series of images associated with a motion animation at the client device instead of displaying a spinner or other icon that indicates that the video is loading or buffering;
a processor configured to send identify predictive frames and key frames to the client device for playback of the media stream starting at the seek location during playing of the motion animation and transition the into playback of the media stream at the seek location by cross-dissolving one or more intermediate key frames directly into playback of the media stream, wherein the motion animation is timed to match full playback of the media stream from the new location to provide a seamless transition between the motion animation and the full playback of the media.

14. The system of claim 13, wherein the intermediate key frames are I-frames.

15. The system of claim 13, wherein the seek location is situated after the initial position in the media stream, wherein the intermediate key frames reside between the initial position and the seek position.

16. The system of claim 13, wherein the seek location is situated before the initial position in the media stream, wherein the intermediate key frames reside between the initial position and the seek position.

17. The system of claim 13, wherein the seek location is situated before the initial position in the media stream, wherein the intermediate key frames reside before the seek position.

18. The method of claim 13, wherein the intermediate key frames are downloaded to the client device when excess bandwidth is available.

19. The method of claim 13, wherein the motion animation is viewable as user input is received at the client device.

20. A non-transitory computer readable medium comprising:
computer code for receiving a seek request from a client device, the seek request received at a streaming server providing a media stream to the client device, wherein the media stream is playing at an initial location at the time of the seek request, wherein the seek request includes a request to play the media stream from a seek location different from the initial location;

computer code for identifying intermediate key frames associated with the seek location;

computer code for sending thumbnails or low resolution versions of the identified intermediate key frames as bandwidth is available, wherein the thumbnail or low resolution versions of the identified intermediate key frames are provided as a series of images that can be viewed as a motion animation of the identified intermediate key frames for display before providing the media stream to the client device beginning at the seek location, wherein the identified intermediate key frames are shown as a series of images associated with a motion animation at the client device instead of displaying a spinner or other icon that indicates that the video is loading or buffering;

computer code for sending predictive frames and key frames to the client device for playback of the media stream starting at the seek location during playing of the animation; and computer code for transitioning the animation into playback of the media stream at the seek location by cross-dissolving the animation directly into playback of the media stream, wherein the motion animation is timed to match full playback of the media stream from the new location to provide a seamless transition between the motion animation and the full playback of the media.

* * * * *